N. A. KEMMISH.
CONDENSATION METER INSTALLATION.
APPLICATION FILED NOV. 7, 1916.
1,264,087.
Patented Apr. 23, 1918.
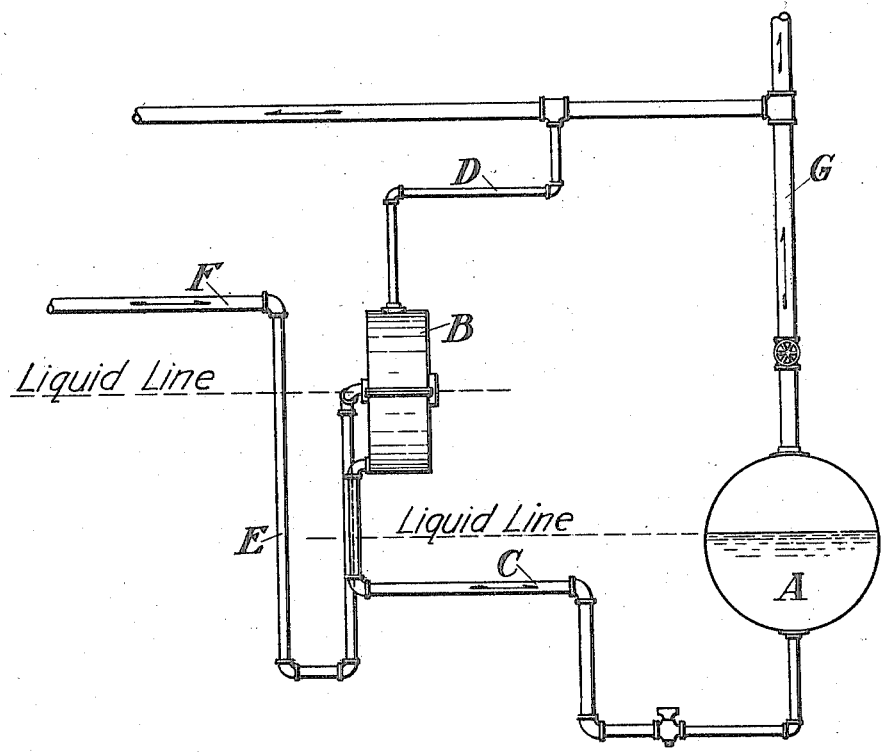
WITNESSES:
INVENTOR.
Nathan A Kemmish

UNITED STATES PATENT OFFICE.

NATHAN A. KEMMISH, OF SPOKANE, WASHINGTON.

CONDENSATION-METER INSTALLATION.

1,264,087.

Specification of Letters Patent. Patented Apr. 23, 1918.

Application filed November 7, 1916. Serial No. 130,081.

*To all whom it may concern:*

Be it known that I, NATHAN A. KEMMISH, a citizen of the United States, and a resident of Spokane, county of Spokane, and State of Washington, have invented new and useful Improvements in Condensation-Meter Installations, of which the following is a specification.

This invention relates to the measurement of condensed vapors in condensable vapor systems by means of meters, and has for its object the use and application of these meters in a service for which they have not thus far been adaptable.

As now applied, condensation meters receive the condensate from a trap, pump, or similar device. This condensate, after passing through the meter, is either wasted or returned to generator or boiler by means of a pump, injector, or similar device.

The object of this invention is to install these meters in the vapor system piping in a manner which effects the proper measurement of the condensate and its delivery to generator or boiler without the use of the auxiliary devices mentioned above.

I attain this object by the arrangement and connections illustrated in the accompanying drawing, in which—

A. is the vapor generator or boiler, having a vapor outlet connection G., and a condensate return C. B. is the condensation meter situated above the liquid line in generator A., and receiving its supply of condensate through pipe F. and water leg E. and delivering the condensate to generator A. through pipe C. D. is a connection introducing gas and pressure from the vapor system into the meter case of meter B.

It will be noted that by introducing gas or vapor under generator pressure into the meter case, liquid and vapor lines in both branches of water-leg E. will be at approximately the same level, and any additional inflow from pipe F. will quietly, steadily, and without water-hammer, cause an overflow into meter B. Also, since meter B. is elevated above the liquid line in the generator A., and the pressures in the generator and the meter case are the same, a ready outlet is provided for metered liquid as released, the meter thus working in an atmosphere of vapor or gas.

In the accompanying drawing a condensation gravity meter of the revolving drum type is shown receiving its supply of condensate at the axis, but the same application is just as readily made to any type of meter depending for its proper operation upon a steady flow of liquid by gravity. Also the vapor connection D. need not necessarily be made directly to the meter case, but may also be in the supply or outlet lines to the meter. Nor is it necessary that the same vapor as that circulating in the system be actually introduced within the meter case. This may be another vapor or gas having its pressure under control by that in the vapor system, or under artificial control by means not connected with the vapor system.

Having thus described my invention, what I claim as new and useful and desire to secure by Letters Patent is:

1. In a vapor generating and condensate measuring system, the combination with a generator, of a meter above the liquid level thereof, means for equalizing the pressure in the generator and meter, a condensate pipe connected to the meter, and a liquid return pipe between the meter and generator.

2. In a closed gravity return steam heating system, the combination with a steam generator and its return and feed pipes, of a gravity operated condensation meter set in the returns above the boiler water line, a pipe for conducting steam between the steam space above the water level in the generator into the meter, a vertical return pipe for condensate to the meter, and a vertical discharge pipe for conveying condensate from the meter below the water line thence to the generator.

3. The combination with a steam boiler and its feed piping, a gravity operated condensation meter set above the boiler water level, and a pipe for steam pressure equalizing between the steam space in the boiler and meter casing, a vertical boiler feed pipe leading up to the inlet of the meter and a vertical discharge pipe from the meter outlet extending down and below the water line in the boiler, thence to the boiler for conveying the metered water of condensation by gravity into the boiler.

NATHAN A. KEMMISH.

Witnesses:
L. J. PORPISIL,
H. W. FAIRWEATHER.

Copies of this patent may be obtained for five cents each, by addressing the "Commissioner of Patents, Washington, D. C."